Patented Apr. 21, 1953

2,636,019

UNITED STATES PATENT OFFICE 2,636,019

ION EXCHANGE RESINS FROM A TRIFUNCTIONAL PHENOL, FORMALDEHYDE AND A MANNICH BASE MADE FROM A TRIFUNCTIONAL PHENOL, FORMALDEHYDE AND A DIALKYLAMINE, MORPHOLINE OR PIPERIDINE

George B. Butler, Gainesville, Fla., and Ben M. Benjamin, Oak Ridge, Tenn., assignors to Research Corporation, New York, N. Y., a corporation of New York No Drawing. Application June 26, 1951,
Serial No. 233,700

8 Claims. (Cl. 260—45)

1

This invention relates to ion exchange resins and particularly to highly basic ion exchange resins containing quaternary ammonium group.

It has been found that useful water insoluble condensation products capable of removing anions from solution may be made by reacting phenolic Mannich bases with formaldehyde and a phenol and with an alkylating agent, the reaction of the Mannich base with the alkylating agent and with the phenol and formaldehyde being carried out in either order.

Mannich bases useful in producing the ion exchange resins of the invention may be obtained by reacting a tri-functional phenol with formaldehyde and a secondary aliphatic amine or its equivalent, such as the dialkylamines, morpholine and piperidine, in equimolecular proportions. The Mannich base or the ester or ether of such a base may then be reacted with an alkylating agent to produce the quaternary ammonium derivative of the Mannich base which is then condensed with sufficient trifunctional phenol and formaldehyde to form a thermosetting resin, or the Mannich base may be condensed with sufficient formaldehyde and trifunctional phenol to produce a thermosetting resin and the resulting resin treated with an alkylating agent to produce the quaternary ammonium derivative. The Mannich base may be formed if desired in the course of the condensation reaction by reacting together a secondary aliphatic amine, a trifunctional phenol and formaldehyde to produce the quaternary ammonium derivative. Among the trifunctional phenols which may be used in preparing the Mannich bases are phenol, m-cresol, 3,5-dimethylphenol, m-ethylphenol, resorcinol, m-chlorophenol, 3,5-dichlorophenol and phloroglucinol.

The following specific examples are illustrative of the principles of the invention:

Example I 2-dimethylaminomethylphenol is made by the reaction of dimethylamine, formaldehyde and phenol. One mole of phenol is placed in a container with one mole of dimethylamine and 65 grams water and 81 grams of aqueous 37% formalin (one mole of formaldehyde) is added dropwise while stirring and cooling to 25–35° C. Stirring is continued for two hours and then the oil layer is separated. The product is an oily liquid boiling at 94–105° C./7–9 mm.

0.1 mole of the dimethylaminomethyl phenol is dissolved in 75 grams of toluene in a flask with an agitator and a reflex condenser with an automatic water separator arranged to continuously return the solvent to the flask and to run the condensed and separated water to waste. 0.1 mole of sulfuric acid (96% $H_2SO_4$) is added in small portions while stirring and keeping the temperature below 30° C. An excess of methanol (0.15 mole) is added and the mixture refluxed four hours. A dark viscous liquid remains in the flask which upon removal of the toluene is completely soluble in water.

The product thus obtained is placed in a container with 0.05 mole of phenol and 10 ml. of concentrated hydrochloric acid and the contents mixed until thoroughly homogeneous. Six grams of paraformaldehyde (0.2 mole formaldehyde) is added and quickly stirred in. The container is heated on a water bath until the resin forms and sets to a rubbery mass. The container is then evacuated with continued heating until the resin forms a hard brittle mass. The hard mass is crushed, washed free of soluble matter converted to the hydroxide form by treating with 5% ammonium hydroxide until no more $-SO_4$ ions are given off, and then washed free of soluble OH ions (phenolphthalein test). The resin thus produced turned neutral potassium chloride solution basic by exchanging Cl$^-$ ions for the OH$^-$ ions on the resin.

Example II 2-morpholinomethylphenol is made by substituting morpholine for dimethylamine in the reaction with phenol and formaldehyde as described in Example I. It is obtained as an oily liquid which crystallizes on standing. Recrystallization from methanol gives white crystals melting at 91–94° C.

A resin is formed by condensation of 0.1 mole of the morpholinomethylphenol with 0.05 mole phenol, 20 ml. concentrated hydrochloric acid and 0.2 mole paraformaldehyde as described in Example I. The resin thus obtained is crushed and placed in a flask with a stirrer and reflux condenser. 200 ml. of methylethylketone and 0.2 mole of dimethyl sulfate are added and the mixture is stirred vigorously and refluxed for six hours. The resin is filtered off, air-dried and converted to the hydroxide form by washing with 5% ammonium hydroxide.

Example III 2-dimethylaminomethylphenol, prepared as described in Example I, is acetylated by adding dropwise an equimolecular amount of acetyl chloride to an acetone solution of the base with agitation while holding the temperature below 0° C. The precipitate which forms is filtered off and washed with fresh acetone. It melts at 163–167° C. and when purified melts at 169–170° C. and contains 13.13% of chlorine.

The ester base is made by dissolving the solid in a small quantity of water and saturating the solution with potassium carbonate. An oily liquid is obtained which, when dried, distills at 86–91° C./3 mm.

The ester base is dissolved in methylisobutylketone and allyl bromide is added. The gum which forms gradually crystallizes. The purified crystals of N,N-dimethyl-N-allyl-N-(2-acetoxybenzyl)-ammonium bromide melt at 115–120° C. and contain 25.44% of bromine.

The quaternary ammonium salt is converted to a resin by reacting 0.1 mole with 0.05 mole of phenol, 8 ml. of concentrated hydrochloric acid and 0.2 mole of paraformaldehyde, as described in Example I. The resin is crushed and converted to the hydroxide form by washing with 5% ammonium hydroxide.

The quaternary ammonium resins of the invention have a relatively high density resulting in a high capacity per unit volume and allowing rapid settling. They are readily regenerated by washing with ammonia.

We claim:

1. Water insoluble quaternary ammonium resinous condensation products of a trifunctional phenol, formaldehyde and a Mannich base resulting from the reaction of a secondary amine of the group consisting of dialkylamines, morpholine and piperidine, a trifunctional phenol and formaldehyde.

2. Water insoluble quaternary ammonium resinous condensation products of phenol, formaldehyde and a Mannich base resulting from the reaction of a dialkylamine, phenol and formaldehyde.

3. A method of making quaternary ammonium compound which comprises reacting a Mannich base from a trifunctional phenol, formaldehyde and a secondary amine of the group consisting of dialkylamines, morpholine and piperidine, with one member of the group consisting of quaternarizing agents and a trifunctional phenol and formaldehyde, and thereafter reacting the reaction product with the other member of said group.

4. A method of making quaternary ammonium ion exchange resins which comprises reacting a Mannich base from a trifunctional phenol, formaldehyde and a secondary amine of the group consisting of dialkylamines, morpholine and piperidine with a quaternarizing agent to produce the quaternary ammonium Mannich base and condensing the product with a trifunctional phenol and formaldehyde to produce a water insoluble resin.

5. A method of making quaternary ammonium ion exchange resins which comprises condensing a Mannich base from a trifunctional phenol, formaldehyde and a secondary amine of the group consisting of dialkylamines, morpholine and piperidine, with a trifunctional phenol and formaldehyde to produce a water insoluble resin and reacting the resin with a quaternarizing agent.

6. A method of making quaternary ammonium compound which comprises reacting a Mannich base from phenol, formaldehyde and a secondary amine of the group consisting of dialkylamines, morpholine and piperidine, with one member of the group consisting of quaternarizing agents and phenol and formaldehyde, and thereafter reacting the reaction product with the other member of said group.

7. A method of making quaternary ammonium ion exchange resins which comprises reacting a Mannich base from phenol, formaldehyde and a secondary amine of the group consisting of dialkylamines with a quaternarizing agent to produce the quaternary ammonium Mannich base and condensing the product with phenol and formaldehyde to produce a water insoluble resin.

8. A method of making quaternary ammonium ion exchange resins which comprises condensing a Mannich base from phenol, formaldehyde and a secondary amine of the group consisting of dialkylamines with phenol and formaldehyde to produce a water insoluble resin and reacting the resin with a quaternarizing agent.

GEORGE B. BUTLER.
BEN M. BENJAMIN.

References Cited in the file of this patent

UNITED STATES PATENTS

| Number | Name | Date |
|---|---|---|
| 2,228,514 | Griessbach | Jan. 14, 1941 |
| 2,341,907 | Cheetham | Feb. 15, 1944 |
| 2,543,666 | Michael | Feb. 27, 1951 |